No. 826,285. PATENTED JULY 17, 1906.
J. SMITH.
CYLINDER FOR CANDY MACHINES.
APPLICATION FILED MAR. 6, 1906.
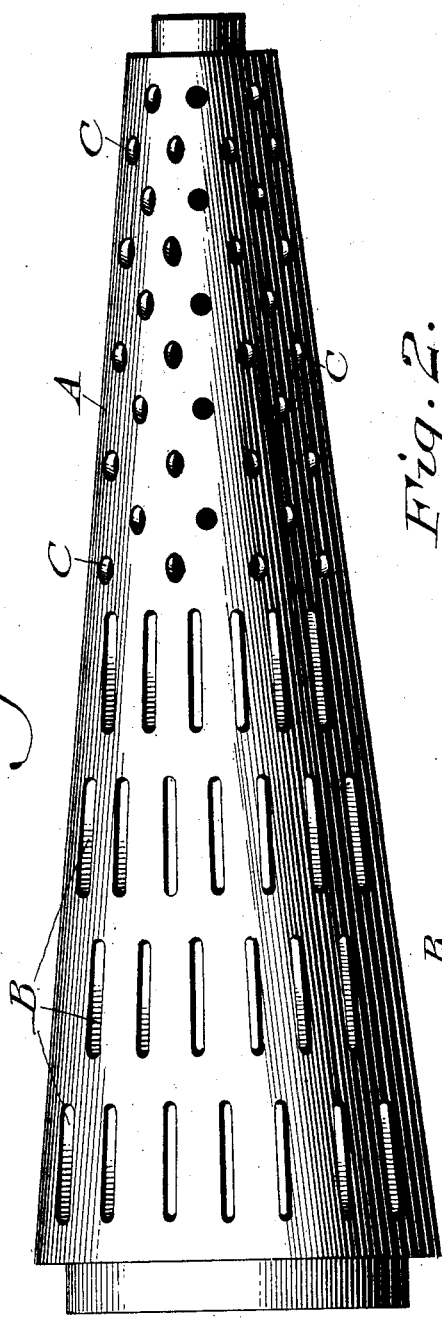
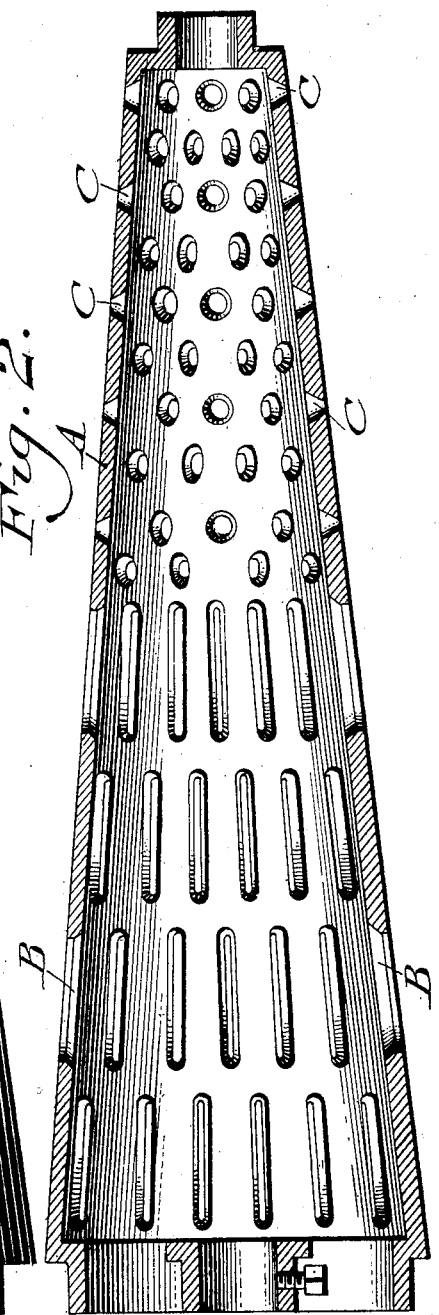
Witnesses
P. F. Nagle.
L. Douville.
Inventor.
John Smith.
By Diedersheim & Fairbanks
Attorneys

UNITED STATES PATENT OFFICE.

JOHN SMITH, OF PHILADELPHIA, PENNSYLVANIA, ASSIGNOR OF ONE-HALF TO HENRY BRANDLE, OF PHILADELPHIA, PENNSYLVANIA.

CYLINDER FOR CANDY-MACHINES.

No. 826,285.　　　Specification of Letters Patent.　　　Patented July 17, 1906.

Application filed March 6, 1906. Serial No. 304,445.

*To all whom it may concern:*

Be it known that I, JOHN SMITH, a citizen of the United States, residing in the city and county of Philadelphia, State of Pennsylvania, have invented a new and useful Cylinder for Candy-Machines, of which the following is a specification.

My invention relates to a new and useful cylinder for candy-machines wherein I employ a hollow cylinder provided with means for insuring circulation therethrough and provided with means for engagement with the candy for suitably actuating the same.

It further consists in providing a portion of the cylinder with elongated openings and the remaining portion with comparatively smaller openings.

Figure 1 represents a side elevation of a cylinder for candy-machines embodying my invention. Fig. 2 represents a sectional view thereof.

Similar letters of reference indicate corresponding parts in the figures.

Referring to the drawings, I have found in practice that in candy-machines where it is desired to work down the candy when it is placed upon the machine so that a portion at one end will be narrowed or the material be reduced from a mass of irregular-shaped material to a smooth cylindrical rod and can be readily drawn out, cut, or otherwise manipulated as desired it is necessary to have the forming means so formed and so constructed that they retain a suitable amount of heat in order to keep the candy material at a proper consistency. To this end, therefore, I have formed a cylinder A, which is hollow and is provided with suitable means for mounting the same upon an axis. I preferably employ two of these cylinders to a machine and which are mounted side by side and are adapted to be suitably rotated. Adjacent the one end of the cylinder are the elongated openings B, which, it will be noted in the drawings, are in staggered order and are situated in the cylinder in the present instance substantially half its length.

C designates smaller openings formed in the walls of the cylinder and which are adjacent or toward the other or discharge end of the cylinder and which are also in staggered order. It will of course be understood that in the candy-machines in which the cylinders are used heat is employed to hold the material, as above stated, in the proper consistency.

The cylinders are suitably rotated, and by reason of the slots and the openings in the wall of the cylinder free circulation of air is permitted through the same, which keeps or holds the cylinders in a suitable condition both for preventing the candy from sticking and from cooling, which it would otherwise do if the said cylinders were not kept at the proper temperature.

In addition the slots form a gripping means for the candy material, so that the same is turned constantly by the cylinders when the latter are rotating, and by the employment of the smaller openings adjacent the discharge of the smaller ends of the cylinders a sufficient gripping means is provided for the material and at the same time the candy leaves the cylinders in proper shape for handling and in a smooth condition. In the drawings I have shown the cylinder as cone-shaped; but it is not necessary that it should be so shaped.

Having thus described my invention, what I claim as new, and desire to secure by Letters Patent, is—

1. A cylinder for candy-machines being formed hollow and having slotted openings adjacent one end and smaller openings adjacent the other.

2. A cylinder for candy-machines formed hollow and provided with slots adjacent the larger end in staggered order and smaller openings adjacent the discharge end, arranged in staggered order.

3. A cylinder for candy-machines having in the walls thereof, openings of different sizes for permitting the circulation of air therethrough and for grasping the candy material.

4. A cylinder for candy-machines formed hollow, having in the wall thereof, openings of different sizes for permitting the circulation of air therethrough and for grasping the candy material.

JOHN SMITH.

Witnesses:
　JOHN A. WIEDERSHEIM,
　C. D. McVAY.